April 13, 1943.   R. P. PIPEROUX ET AL   2,316,283
PREPARATION OF PLASTIC MOLDING MATERIAL
Filed May 8, 1941   2 Sheets-Sheet 1
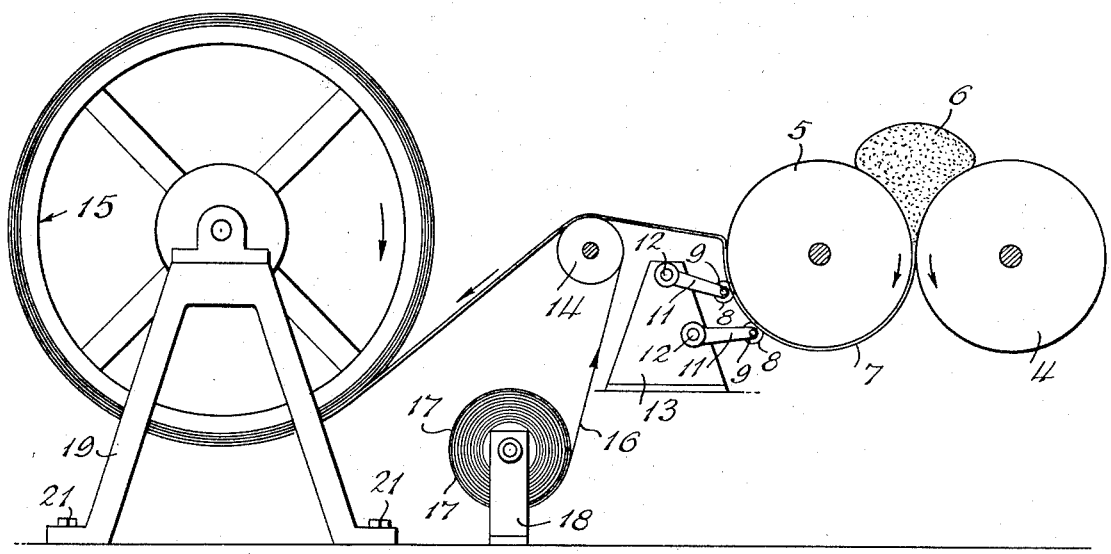
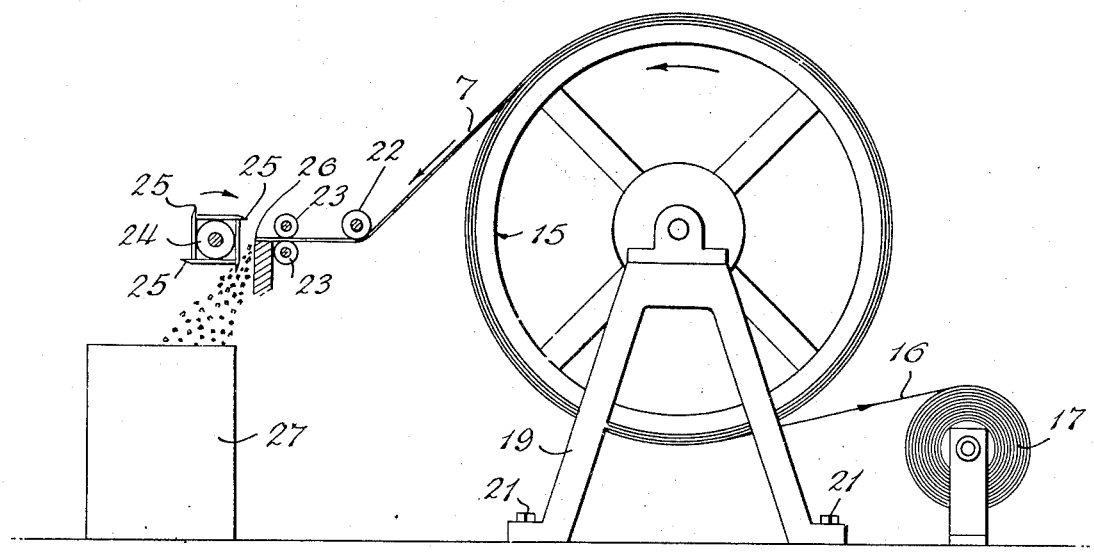
INVENTORS
RENE P. PIPEROUX
AND DIMITRI G. SOUSSLOFF
BY
ATTORNEYS

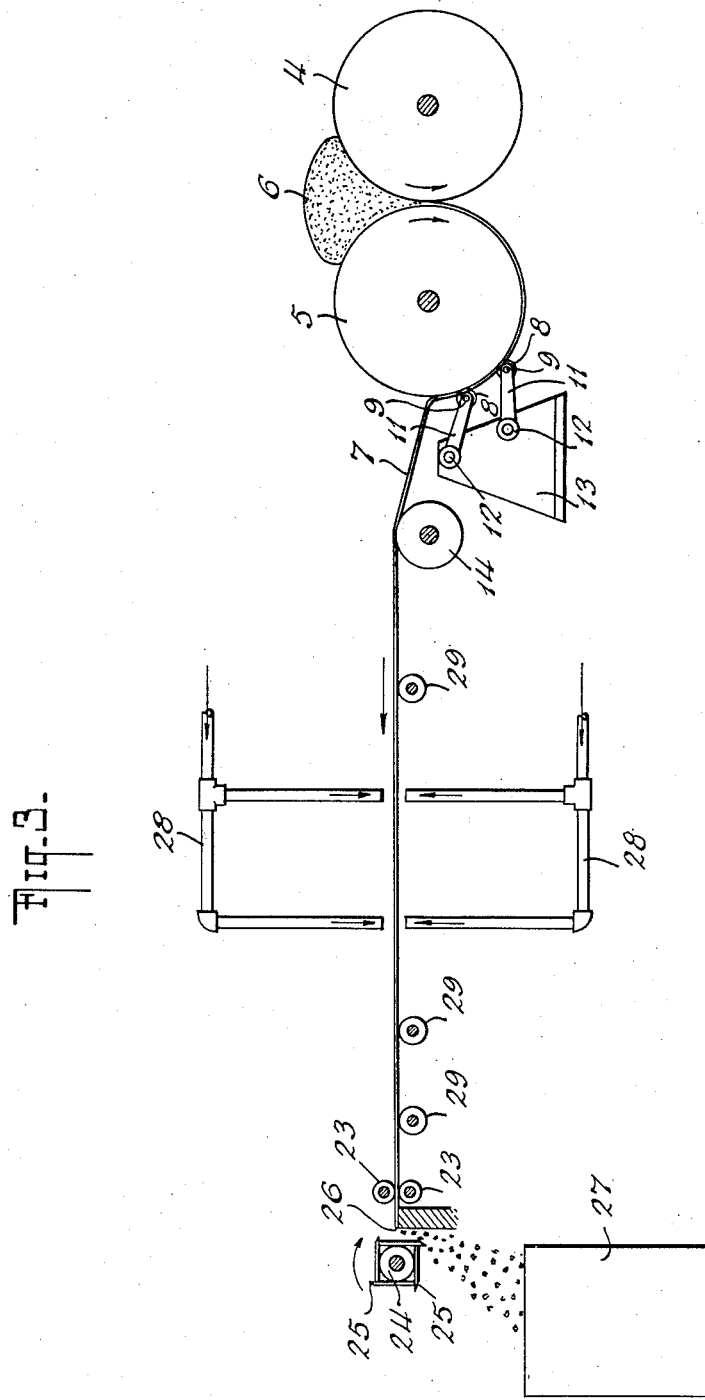

Patented Apr. 13, 1943

2,316,283

UNITED STATES PATENT OFFICE 2,316,283

PREPARATION OF PLASTIC MOLDING MATERIAL

Rene P. Piperoux, Radburn, N. J., and Dimitri G. Soussloff, New York, N. Y., assignors, by mesne assignments, to Celanese Corporation of America, a corporation of Delaware Application May 8, 1941, Serial No. 392,428

10 Claims. (Cl. 18—48)

This invention relates to the production of plastic molding material, and relates more particularly to the production of plastic molding material in particle form.

An object of our invention is the provision of a simple, expeditious and economical process for producing plastic material in particle form suitable for molding.

Another object of our invention is to provide a process for the preparation of granules of plastic material suitable for molding without producing any granules or particles which are too large or too small to be used in molding machines.

A further object of our invention is to provide a process for preparing granules of plastic material of uniform size and shape which are eminently suitable for the production of molded articles.

Other objects of our invention will appear from the following detailed description.

In the processing of plastic material to obtain granules suitable for use in say, compression or injection molding machines to produce molded articles, as heretofore commonly practiced, the plastic material, after it was colloidized or "converted" and perhaps had color added thereto, was passed between smooth, steel rolls to form a sheet of about one-eighth of an inch in thickness. As the sheet issued from the rolls, two operators took hold of it and guided it upon a table. When a suitable length of the sheet had issued from the rolls, usually about sixty inches, a third operator cut across the sheet with a knife and guided the new end coming from the rolls upon the table. This operation was repeated until the entire charge was cut into these large sheets. This was not an easy operation, not only from the standpoint of handling large sheets, but also because the sheets of plastic material coming from the rolls were very hot and emitted strong, unpleasant fumes which made the breathing of the operators difficult. Such was particularly the case when the plastic comprised a cellulose derivative base containing a solvent or plasticizer volatile at the elevated temperatures used for converting or softening.

These large sheets of plastic material were then cut by a hand knife into pieces of about 10 x 20 inches. This operation was also difficult of accomplishment and necessitated an expenditure of considerable energy on the part of the operatives. Since the plastic material was very hot and sticky, it was necessary to separate the 10 x 20 inch pieces or sheets one from the other and distribute them over considerable space in order that they may cool off. When cooled, these sheets were fed into a grinder to produce particles of the approximately desired dimensions. This grinding operation, however, produced particles which were not only of irregular shape and unequal dimensions, but it also yielded a large amount, frequently ten percent or more, of oversize particles as well as extremely small particles called "fines." These oversize and small particles were a definite economic loss since they had to be seized out from the particles of commercially satisfactory size. Moreover, the particles were often contaminated during the grinding operation while the plastic material was being cut and whirled around inside of the grinding mill.

Thus, in prior processes for making particles of plastic material suitable for molding, a great deal of time and effort was spent in producing and inspecting the same after the necessary chemical properties were imparted to the plastic material on the malaxating rolls.

The foregoing disadvantages of operation and product are obviated by the process of our invention. In accordance with our process, granules of uniform size and shape are produced from plastic material by first cutting or forming the plastic material, say about ⅛ of an inch in thickness, into a plurality of narrow ribbons of required width, say $\frac{1}{16}$ of an inch in width, on the roll of the malaxating or heating device, then taking the band or sheet of ribbons off the roll and winding it continuously on a wheel or drum, preferably inserting an interliner between the layers of ribbons, until the entire charge is taken off the rolls. The material is then left on the wheel until it is approximately at room temperature. After cooling, the band or sheet of material, made up of many narrow ribbons slightly adhering together at the cut edges, is taken off the wheel and fed into a rotary cutter by means of feed rolls operating at such a speed as to give the desired length of cut. The former operations of sieving, inspecting, reworking, etc. are thereby eliminated by our new and simpler method.

Owing to the heat-softened condition of the plastic the cutting action at elevated temperatures becomes very efficient, rendering possible the practical easy multiple slitting or forming of the material into narrow ribbons, say ⅜ of an inch or less in width.

While it was thought that the numerous narrow ribbons resembling so many loose spaghetti might readily tangle up and tend to reweld or fuse into each other because of their very soft and sticky consistency and their closeness to each other, it was found quite unexpectedly that the ribbons, as they left the hot roll and became subsequently chilled, quickly assumed a set condition, the individual strands or ribbons being only very slightly stuck to each other at their cut edges. This slight adhesion was found to be a very desirable feature since the many ribbons could be handled as a single sheet or band in winding on the wheel or passing to the rotary cutter after adequate cooling. These ribbons easily fall apart or separate under the impact of the cutter so that distinct, individual granules are formed. As stated before, this favorable behavior of the plastic was quite unexpected.

It was also thought that the removal of the plastic from the malaxating roll would leave open spaces on same, thereby interfering with the smooth, continuous operation of the process. On the contrary, the plastic being at such high temperatures, say 200° F. and higher, readily flows out and automatically fills up all voids on the surface of the roll, so that fresh material is always present at the places where it is slitted and removed. All these advantages were quite unforeseen. Hence, it is evident that this process affords a rapid practical formation of plastic materials into narrow ribbons, which ribbons, besides being adapted for cutting into granule form, also find useful applications per se, such as in the production of canes for making wicker furniture, etc. The ribbons after separation may also be individually drawn through forming and swedging devices to form rods, moldings and other extruded shapes and articles.

It is further evident from the foregoing description of the behavior of the plastic, that the formation of ribbons could also be accomplished by using a grooved or serrated roll, the cutting edges of which press against another smooth or similarly grooved surface. However, owing to the excessive wear and tear of the cutting or forming edges revolving in contact with hard surfaces, this method of forming ribbons is not as desirable as one in which a series or plurality of cutting knives or discs are employed as explained below.

It is seen from the foregoing that the function of the rolls is to heat the stock to a proper temperature or until the required degree of softness and plasticity is attained. The malaxation or colloidalization of the plastic into sheet form may obviously be accomplished in a separate device. However, for simplicity of operation and production it is preferable to utilize cylindrical malaxating rolls for this purpose, although other heated surfaces may be employed.

Furthermore, it is evident that this process is applicable to any plastic which becomes heat softened as to be cut and formed continuously into narrow ribbons as heretofore described. This process is particularly applicable to the production of ribbons and granules of thermoplastic compositions containing organic derivatives of cellulose such as the organic esters and ethers of cellulose. Examples of such organic esters of cellulose are cellulose acetate, cellulose propionate, cellulose butyrate or mixed esters such as cellulose acetate-propionate or cellulose acetate-butyrate, while examples of such ethers are ethyl cellulose, methyl cellulose and benzyl cellulose. Other thermoplastic compounds or bases may be used regardless of whether they retain their thermoplastic nature after final molding. Such other plastic materials may be phenol-formaldehyde, urea-formaldehyde, glycerol-phthalic anhydride, and other similar resins and polymerized vinyl and acrylic acid derivative resins such as polymerized vinyl acetate, mixed vinyl chloride and vinyl acetate, Styrol, methyl methacrylate, etc. which plastic materials are known today in commerce under various names. It is to be understood that the term "plastic" in the claims refers to all such aforementioned materials.

The wheel referred to above upon which the sheet of ribbons is wound is not essential to our process. Instead of the wheel the material, which is cut or formed into ribbons, may be led from the malaxating or heating roll and the feed rolls of the rotary cutter. Any suitable cooling expedient may be employed such as, for example, blasts of cold air impinging on the sheet of ribbons or by passing the sheets of ribbons in contact with cooling rolls.

The speed at which the band or sheet may be taken from the rolls depends on the peripheral speed of said rolls, and the speed of feeding the strip into the cutter depends upon the length of cut and the number of cuts per minute that can be obtained from the cutting machine. By employing a cutter comprising a shaft on which four cutting edges are mounted, which shaft having a speed of, say, 1,200 revolutions per minute, there may be obtained 4,800 cuts per minute. If a larger granule is required, the machine of course may cut more pounds of material per given length of time.

Producing granules of plastic material suitable for molding in accordance with our invention is exceptionally efficient since it can make use of malaxating rolls operating at any rate of speed. On the old type of small malaxating rolls, where the peripheral speed was only about thirty feet per minute and the charge was about one-hundred fifty pounds the problem of handling was not as acute as it becomes when the peripheral speed of rolls is boosted, say, to one hundred feet per minute and the charge to be handled is, say, from six hundred to seven hundred pounds as in modern practice. Accordingly, one trying to produce plastic material in accordance with prior methods on modern equipment, the various problems become greatly accentuated. For example, on the large modern type of malaxating roll, which is sixty inches wide and twenty-four inches in diameter with a peripheral speed of one hundred feet per minute, it is impossible to take off material in thin sheet form directly. Accordingly, the whole mass of plastic material is usually taken off in slabs of about two inches in thickness and then divided between many small rolls from which two men take off the material in one sheet about one-eighth of an inch thick and as wide as the width of the face of the rolls, put it on the table and then cut it into pieces of about ten inches by twenty inches, as previously described above. In accordance with one of the prior processes most commonly employed, one man could take off the entire charge of about one hundred and fifty pounds in about one hour, and then grind it up into granules by passing it through the grinder in about one-half hour. The rate of production in this case is approximately one hundred pounds per man per hour. In accordance with the present invention, however, the overall rate of production is fifteen hundred to two thousand pounds per man per hour, or approximately eight times as high as prior production.

Our invention will now be described in greater detail with reference to the accompanying drawings wherein:

Figure 1 is a side elevation of an arrangement of apparatus for carrying out one phase of the process of our invention, Figure 2 is a side elevation of an arrangement of apparatus for carrying out a second phase of our process, and Figure 3 is a side elevation of a modified arrangement of apparatus for carrying out our process.

Like reference numerals indicate like parts throughout the several views of the drawings.

Referring to Figures 1 and 2 there is shown a pair of malaxating rolls 4 and 5 in the nip of which rolls is placed stock 6 which may be in the form of thermoplastic powder or resin therefor, or in the form of plasticized and colloidized cellulose derivative materials. The thin sheet 7 formed on roll 5 is cut into ribbons of desired width by means of a plurality of suitably spaced, say, $\frac{1}{8}$ of an inch apart, disc cutters 8 about four inches in diameter, pressing and cutting against the face of roll 5. The disc cutters are mounted on shafts 9 held in brackets 11, which brackets are pivotally mounted at 12 on a suitable support 13. The sheet 7 now in the form of a plurality of ribbons is positively drawn from roll 5, passing over idler roller 14, by means of a wheel or drum generally indicated by reference numeral 15 which may be driven by any suitable means (not shown). The idler roller is preferably situated above the cutters 8 and provides a surface against which the sheet or band of material cut into ribbons is stripped from the malaxating roll 5. If desired or found necessary one or more additional idler rollers may be inserted between the idler roller 14 and the point on the roll 5 at which the slitted material is stripped from said roll 5. An interliner 16 from a roll 17 mounted in suitable brackets 18 is also wound on wheel 15 between the layers of the sheet of ribbons of plastic material. The material employed as interliner should be one which does not stick to or is affected by the molding material and one, however, which can stand the temperature of said plastic material without deterioration. For example, a suitable fabric coated or impregnated with a Bakelite resin or a thin band of metal may be used. The interliner not only prevents sticking together of the layers of the molding material but also provides a support for the molding material between roller 14 and wheel 15.

After the charge of plastic material 6 is continuously and automatically formed into a sheet and the sheet formed into ribbons and taken off and wound upon wheel 15, the material is permitted to cool. The wheel 15 is shown mounted on a support 19 which is fastened to the floor by means of bolts 21. However, the wheel 15 may be mounted on a support having rollers thereon so that it may be moved away from the malaxating rolls and replaced by an empty wheel which would receive a second charge of plastic material while the first charge is cooling.

When the material on the wheel has cooled sufficiently, it is taken off, passed under idler roller 22 and between positively driven feed rollers 23 which draw the band of ribbons 7 from the wheel 15 and feed said ribbons at a predetermined rate to rotary cutter 24 having transverse cutting edges 25 which cooperate with edge 26 and cut the sheet of ribbons into granules of uniform size and shape which fall into a receptacle 27. As the sheet 7 is unwound from the wheel 15 the interliner 16 is rewound into a roll and may be used again.

Referring to Figure 3, an arrangement of apparatus is shown wherein the wheel or drum is not employed. Instead the sheet of ribbons is cooled by blasts of cold air impinging on both surfaces of the sheet. This cold air is supplied from a suitable source and is applied to the sheet by means of conduits 28. In its passage from idler roller 14 to positively driven feed rolls 23, the sheet of ribbons is supported on a series of idler rollers 29. The speed of the rotary cutters is, of course, regulated to produce the desired size of granules, the speed of the malaxating rolls being taken into consideration.

As stated previously, the plastic sheet slitting and stripping arrangement outlined above is such that the individual ribbons have a tendency to weld or adhere together only slightly at their cut edges to form a band which may be conveniently handled as a single sheet. When the material is cold and is fed to the transverse cutters revolving at a high speed, the ribbons which were somewhat stuck together easily break up by impact along the joints to yield individual separate granules of desired size, such as cubical or flat grains measuring from $\frac{1}{8}$ of an inch to $\frac{3}{8}$ of an inch in size.

The granules of plastic material produced in accordance with this invention are comparatively uniform as to size and shape, have clean-cut edges and are free from "fines" and oversize grains as well as from contaminating substances. The uniformity of size and "bulk value," i. e. the volume occupied by a certain weight of material is highly desirable from the molder's point of view since in many cases the plastic material is measured by volume in the molding machine. The freedom of "fines" and oversize granules from the molding material produced in accordance with this invention makes for efficient molding operation since the presence of "fines" and oversize grains prevent even distribution of heat in the material in the heating cylinder of, say, an injection molding machine. The absence of "fines" and oversize particles also permits of perfect control over color mottling and configurations since it is evident that different sized particles may melt and flow at different rates when subjected to heat and pressure.

It is to be understood that the foregoing detailed description is merely given by way of illustration and that many variations may be made therein without departing from the spirit of our invention.

Having described our invention, what we desire to secure by Letters Patent is:

1. Process for the production of granules of plastic material suitable for molding, which comprises longitudinally slitting a sheet of heat softened plastic material to form ribbons of predetermined width, cooling said ribbons of plastic material to set the same, and then transversely cutting said ribbons so as to form granules of substantially uniform size and shape.

2. Process for the production of granules of plastic material suitable for molding, which comprises longitudinally slitting a sheet of heat-softened plastic material to form ribbons of predetermined width, cooling said ribbons of plastic material to set the same, while maintaining said ribbons in sheet form, and then transversely cutting said ribbons so as to form granules of substantially uniform size and shape.

3. Process for the production of granules of plastic material suitable for molding, which comprises longitudinally slitting a sheet of heat-softened plastic material to form ribbons of predetermined width, winding said ribbons in sheet form on a wheel so as to cool and set the same, unwinding the same from the wheel and then transversely cutting said ribbons so as to form granules of substantially uniform size and shape.

4. Process for the production of granules of plastic material suitable for molding, which comprises forming a sheet of plastic material by working the same between heat-softened surfaces, longitudinally slitting said heated plastic sheet to form ribbons of predetermined width, cooling said ribbons of plastic material to set the same and then transversely cutting said ribbons so as to form granules of substantially uniform size and shape.

5. Process for the production of granules of plastic material suitable for molding, which comprises subjecting a sheet of plastic material between heated surfaces, longitudinally slitting said heat-softened plastic sheet to form ribbons of predetermined width, cooling said ribbons of plastic material to set the same while maintaining said ribbons in sheet form and then transversely cutting said ribbons so as to form granules of substantially uniform size and shape.

6. Process for the production of granules of plastic material suitable for molding, which comprises forming a sheet of plastic material by working the same between heated surfaces, longitudinally slitting said heat-softened plastic sheet to form ribbons of predetermined width, winding said ribbons in sheet form on a wheel so as to cool and set the same, unwinding the same from the wheel and then transversely cutting said ribbons so as to form granules of substantially uniform size and shape.

7. Process for the production of granules of plastic material suitable for molding, which comprises forming a sheet of plastic material by working the same between heated surfaces, longitudinally slitting said heat-softened plastic sheet on one of said surfaces to form ribbons of predetermined width, cooling said ribbons in sheet form to set the same and transversely cutting said ribbons so as to form granules of substantially uniform size and shape.

8. Process for the production of granules of plastic material suitable for molding, which comprises forming a sheet of plastic material by working the same between heated surfaces, longitudinally slitting said heat-softened plastic sheet to form ribbons of predetermined width, removing said sheet of ribbons from the latter surface in such a manner that the ribbons are caused to adhere slightly together, cooling said ribbons in sheet form to set the same, and then transversely cutting said ribbons so as to form granules of substantially uniform size and shape.

9. Process for the production of granules of plastic material suitable for molding, which comprises forming a sheet of plastic material by working the same between heated surfaces, longitudinally slitting said heat-softened plastic sheet on one of said surfaces to form ribbons of predetermined width, winding said ribbons in sheet form on a wheel so as to cool and set the same, unwinding the same from the wheel and then transversely cutting said ribbons so as to form granules of substantially uniform size and shape.

10. Process for the production of granules of plastic material suitable for molding, which comprises forming a sheet of plastic material by working the same between heated surfaces, longitudinally slitting said heat-softened plastic sheet to form ribbons of predetermined width, removing said sheet of ribbons from the latter surface in such a manner that the ribbons are caused to adhere slightly together, winding said ribbons in sheet form on a wheel so as to cool and set the same, unwinding the same from the wheel and then transversely cutting said ribbons so as to form granules of substantially uniform size and shape.

RENE P. PIPEROUX.
DIMITRI G. SOUSSLOFF.